United States Patent [19]

Newberg

[11] Patent Number: 5,584,138
[45] Date of Patent: Dec. 17, 1996

[54] FISHING TACKLE CONTAINER

[76] Inventor: Curtis G. Newberg, 51001 110th St., Cosmos, Minn. 56228

[21] Appl. No.: 524,765

[22] Filed: Sep. 7, 1995

[51] Int. Cl.⁶ ..................................................... A01K 97/06
[52] U.S. Cl. ........................ 43/57.1; 224/920; 206/315.11
[58] Field of Search .................................... 43/54.1, 57.1; 206/315.11, 389; 220/507; 224/920

[56] References Cited

U.S. PATENT DOCUMENTS

| | | | |
|---|---|---|---|
| 2,683,642 | 7/1954 | Stoleson . | |
| 3,154,880 | 11/1964 | Campbell | 43/57.1 |
| 3,166,866 | 1/1965 | Norton | 43/57.1 |
| 3,392,477 | 7/1968 | Haugen | 43/57.1 |
| 3,678,611 | 7/1972 | Files . | |
| 4,128,170 | 12/1978 | Elliott | 43/57.1 |
| 4,245,422 | 1/1981 | Souza | 43/57.1 |
| 4,372,073 | 2/1983 | Goldman | 43/57.1 |
| 4,691,469 | 9/1987 | Alsobrook | 43/54.1 |
| 4,791,752 | 12/1988 | Van Kampen | 43/57.1 |
| 4,901,464 | 2/1990 | Banoun . | |
| 4,970,821 | 11/1990 | Young . | |
| 5,033,228 | 7/1991 | Gallivan | 43/54.1 |
| 5,297,676 | 3/1994 | Coleman . | |

Primary Examiner—Joseph J. Hail, III
Assistant Examiner—James Miner
Attorney, Agent, or Firm—David A. Lingbeck

[57] ABSTRACT

Fishing tackle container having a rolling slide mechanism which captures fishing lures and associated items between members of a rolling slide located central to the surrounding container.

2 Claims, 5 Drawing Sheets

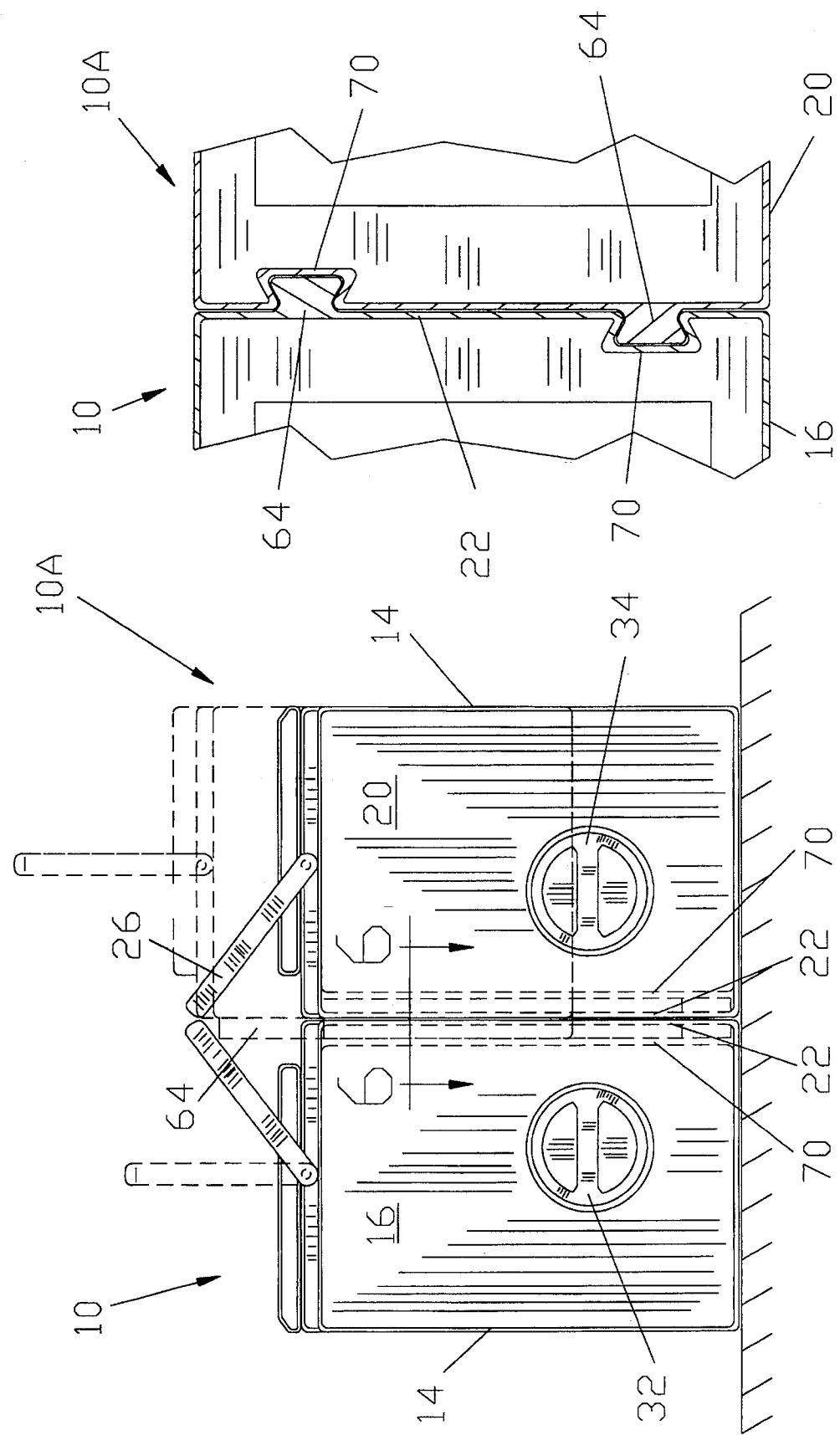

5,584,138

FISHING TACKLE CONTAINER

CROSS REFERENCES TO CO-PENDING APPLICATIONS

None.

BACKGROUND OF THE INVENTION

1. Field of the Invention

The present invention is for a fishing tackle container, and more particularly, pertains to a fishing tackle container having a centrally located rolling slide.

2. Description of the Prior Art

Traditional fishing tackle boxes have often included compartmentalized areas for the storage of fishing lures having multi-dimensional hooks, such as treble hooks and the like. Often when more than one lure was included in a compartment, the hooks became entangled and difficult to disengage from one another often resulting in a tangle which was difficult to correct. The fishing tackle container offers a novel approach in keeping fishing lures separated by use of a rolling slide where fishing lures are captured in separation from each other.

SUMMARY OF THE INVENTION

The general purpose of the present invention is a fishing tackle container with a rotating storage slide.

According to one embodiment of the present invention, there is provided a fishing tackle container, including a central roller suspended between the side wall members of a rectangular containment member. A flexible polymer sheet member having an attached closed-cell foam pad secures to and winds about the central roller. A rolling door front panel secures to the outboard end of the polymer sheet member and is utilized to unroll the polymer sheet member and layer of closed-cell foam pad, and position the polymer sheet member and attached foam member exterior to the confines of the rectangular containment member. End caps, each including a cross bar member, located at the ends of the central roller, are rotated to retract the polymer sheet member and closed-cell foam pad containing fishing lures or other such material into the interior of the containment member. As the polymer sheet member and closed-cell foam pad members are wound about the central roller, the lures and other objects are sandwiched between the foam pad and the overlying polymer sheet member and held in captivity in the rolled foam pad and polymer sheet members by compression, friction and tension.

One significant aspect and feature of the present invention is a fishing tackle container having a centrally located rolling slide incorporated for the methodical capture of hard to handle or store fishing lures and associated equipment.

Another significant aspect and feature of the present invention is a fishing tackle container which actively secures each fishing lure or other item in a location distant from another stored lure to prevent tangling of the lures with each other.

Yet another significant aspect and feature of the present invention is a central roller around and about which a flexible polymer sheet and closed-cell foam are wound to capture fishing lures and other associated equipment.

Still another significant aspect and feature of the present invention is a rolling slide which pulls out to present a flat and planar surface for placement or retrieval of fishing lures and associated equipment.

An additional significant aspect and feature of the present invention is a removable compartment which attaches to the inner confines of the rolling slide.

A further significant aspect and feature of the present invention is the utilization of insulated materials.

A still further significant aspect and feature of the present invention is the ability to connect and mate the back walls of like fishing tackle container units to form a combined single unit.

Having thus described embodiments of the present invention, it is one principal object of the present invention to provide a fishing tackle container having a rolling slide for the orderly storage of fishing tackle and associated devices.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 5 illustrates the mating of one fishing tackle container with another fishing tackle container; and, FIG. 6 illustrates a cross sectional view of the engaged grooves and tracks.

DETAILED DESCRIPTION OF THE PREFERRED EMBODIMENTS

Figure 1:
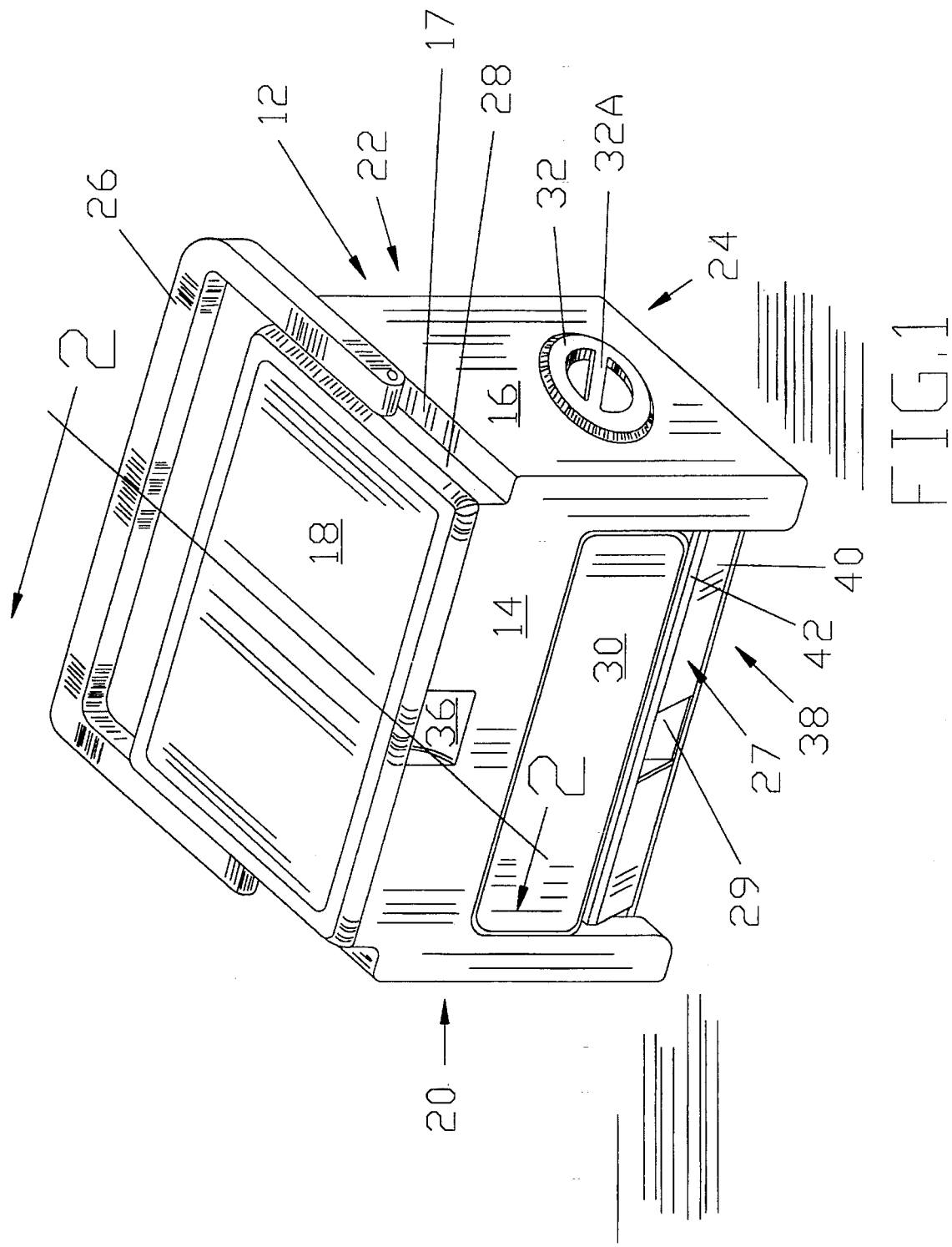
FIG. 1 illustrates a perspective view of a fishing tackle container, the present invention.
Figure 2:
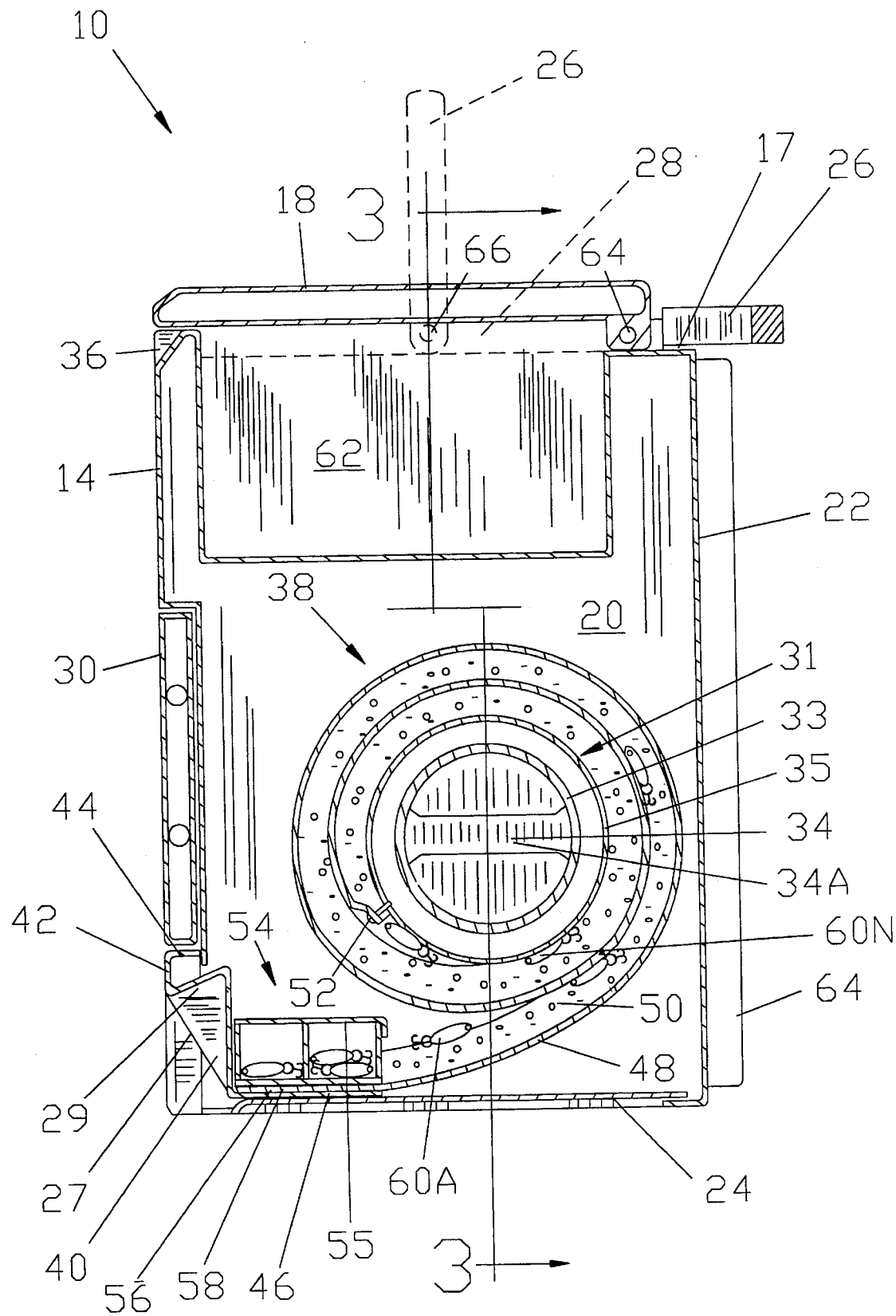
FIG. 2 illustrates a cross sectional side view of the fishing tackle container along line 2—2 of FIG. 1.
Figure 3:
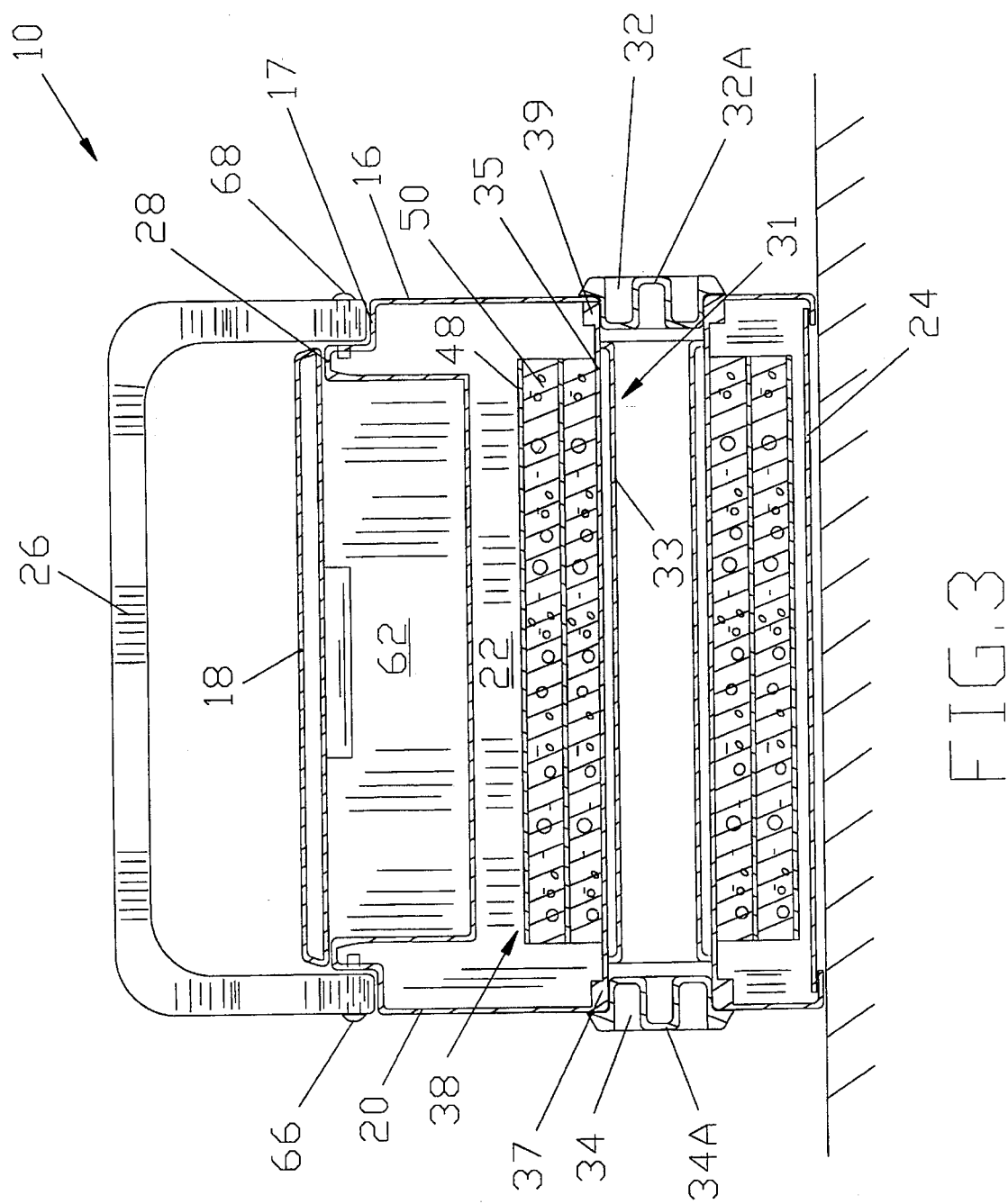
FIG. 3 illustrates a cross sectional view of the fishing tackle container along line 3—3 of FIG. 2.

FIG. 1 illustrates a perspective view of a fishing tackle container 10, the present invention. Members of the fishing tackle container 10 include a rectangular containment member 12 having a front wall 14, a side wall 16, a narrow top edge 17, and a hinged insulated lid 18. Side wall 20, back 22 and bottom 24 are illustrated in following FIGS. A handle 26 pivotally secures to a lip member 28 which extends upwardly from the narrow top edge 17. A rolling slide front panel 27 is accessed by a recessed handle member 29 beneath an insulated panel 30. An insulated end cap 32 is located in side wall 16 and another insulated end cap 34 is located in side wall 20, as illustrated in FIG. 2. End caps 32 and 34 secure to the inboard end of a rolling slide 38, as illustrated in FIGS. 2 and 3, and are incorporated to retract the rolling slide. A recess 36 in the front wall 14 provides for ready manual access to the under side of the hinged lid 18 for access to a compartment lying just below the hinged lid 18.

FIG. 2 illustrates a cross sectional side view of the fishing tackle container 10 along line 2—2 of FIG. 1 where all numerals correspond to those elements previously described. The one piece front panel 27 includes an angled panel portion 40, a vertical panel portion 42, an upper horizontal panel portion 44, and a lower horizontal portion 46. Attached to the front panel 27 is a flexible polymer sheet member 48 having a closed-cell foam pad 50 secured, such as by gluing or other suitable bonding, to the flexible polymer sheet member 48. The flexible polymer sheet member 48 and the foam pad 50 are wound back upon or around themselves, and are secured to a central roller 31 having an inner cylindrical wall 33 and an outer cylindrical wall 35 by fasteners, such as fastener 52. A removable segmented compartment 54, having a lid 55, is secured by hook and latch devices 56 and 58, such as VELCRO® to the lower horizontal portion 46 of the flexible polymer sheet member 48. Items 60*a*–60*n*, such as fishing lures or other related devices, are held securely and immovable by force of compression, tension and friction of the closed-cell foam pad 50 against the adjacent rolled flexible polymer sheet member 48.

An upper compartment 62 extends downwardly from the lip member 28. Hinged lid 18 pivots about pivot points, such as pivot point 64, to seal the upper compartment 62. The compartment 62 can be used as storage for fishing equipment, food, beverages, ice and the like. A track 64 is illustrated on the back wall 22. The track 64 is configured to attach one fishing tackle container 10 to another as illustrated in FIGS. 5 and 6. Handle 26 is also illustrated in a pivoted position by dashed lines. Handle 26 pivots about pivot points 66 and 68 as illustrated in FIG. 3.

FIG. 3 illustrates a cross sectional view along line 3—3 of FIG. 2 where all numerals correspond to those elements previously described. Illustrated in particular is the rolling slide 38 suspended between the side wall members 16 and 20. The ends of the outer cylindrical wall 35 extend through circular bores 37 and 39 in wall members 20 and 16, respectively. Opposing end caps 34 and 32 align and secure at opposite ends of the inner bore of the outer wall 35. End caps 34 and 32 include bar members 34*a* and 32*a* for manual rotation of the rolling slide during slide retraction. The rolling slide 38 includes the central roller 31, end caps 32 and 34, flexible polymer sheet member 48, foam pad 50, the rolling door front panel and the recessed handle member 29.

MODE OF OPERATION

Figure 4:
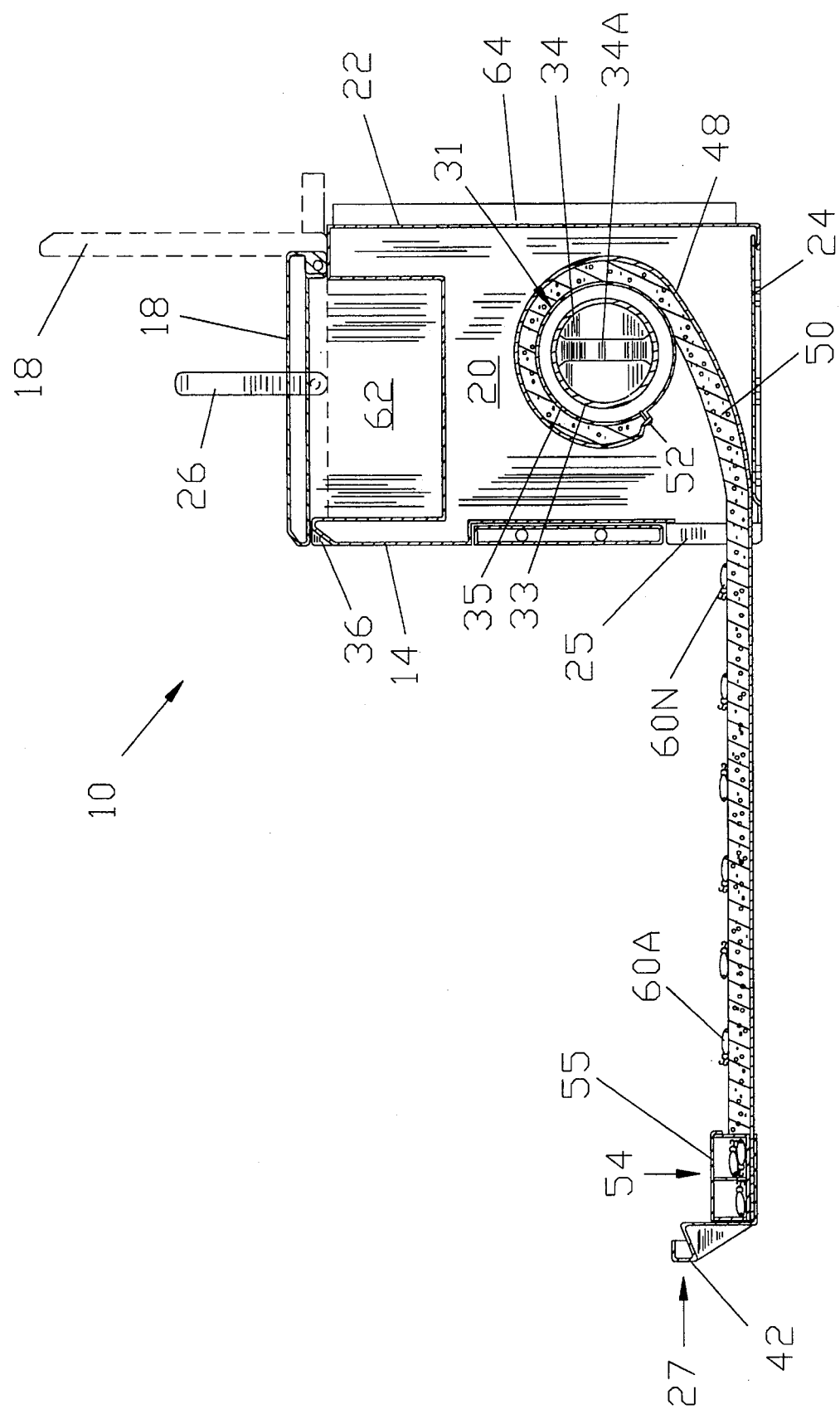
FIG. 4 illustrates the mode of operation of the fishing tackle container.

FIG. 4 best illustrates the mode of operation of the fishing tackle container 10 where all numerals correspond to those elements previously described. Actuation of the rolling door front panel 27 outwardly from its surrounding cavity 25 at the lower portion of side wall member 14 causes the flexible polymer sheet member 48 and the foam pad 50 to be unwound and to assume a planar shape, thus presenting items 60*a*–60*n*, such as fishing tackle and/or other associated items, for placement on the upper surface of the foam pad 50. The user simply removes a lure for use, or can deposit a lure or other device on the surface of the foam pad 50. The removable compartment 54 is also accessible at this time. When finished with the selection of a fishing lure or when another lure is placed for storage on the foam pad 50, end caps 32 and 34 are manually rotated to retract the flexible sheet member 48 with the attached foam pad 50 into the interior of the fishing tackle container 10. Rotation of one of the end caps 32 or 34 in the proper direction causes the flexible sheet member 48 and the attached foam pad 50 to be wound about the central roller 31. As this is accomplished, the items 60*a*–60*n*, such as lures, are frictionally engaged between the upper surface of the foam layer 50 and the bottom surface of the previously wound flexible polymer sheet member 48. The lures are spaced from each other on the foam pad 50 prior to retraction of the rolling slide 38 and remain suitably spaced as previously placed upon the foam layer 50 until the rolling slide 38 is actuated to present the contents at another time. Hinged lid 18 is also illustrated in the open position in dashed lines for access to the upper compartment 62.

The container can be soft-sided, such as a polymer-like cloth or material with a zipper door closure. The drawer can be a sandwich of polyether foam secured to a high density polymer by a suitable adhesive.

The container can also be permanently affixed to a boat or incorporated into the structure of a boat.

FIGS. 5 and 6 illustrate the mating of one fishing tackle container 10 with another like fishing tackle container 10*a*. The back wall of fishing tackle container 10 (and 10*a*) includes a vertically oriented track 64 and a groove 70. Track 64 of each fishing tackle container 10 (and 10*a*) engages the groove 70 of the opposing fishing container to join the fishing tackle containers together at their respective back walls 22 to form a single unit-like structure. Handles 26 of each fishing tackle containers 10 and 10*a* are pivoted to meet as illustrated so that both handles can be simultaneously grasped to transport the joined unit as a single item. In FIG. 5, like fishing tackle container 10*a* is shown partially in dashed lines during the first steps of engagement where the respective tracks 64 slidingly engage the respective grooves 70 of the opposing like fishing tackle containers 10 and 10*a*. FIG. 6, a horizontal cross section, illustrates engagement of the tracks 64 with grooves 70.

Various modifications can be made to the present invention without departing from the apparent scope hereof.

I claim:

1. A fishing tackle container comprising:

a. a containment member with opposing end members;

b. an upper compartment in said containment member;

c. a handle affixed to said upper compartment;

d. a central roller;

e. a finite length of polymer member and closed-cell foam member wound about said central roller; and means for unwinding said polymer member and closed-cell foam member from about said central roller and for accessing and withdrawing said polymer member and closed-cell foam member from said containment member, said means for unwinding attached to said polymer member and closed-cell foam member.

2. A fishing tackle container comprising:

a. a containment soft-sided member with opposing end members;

b. an upper compartment in said containment member;

c. a handle affixed to said upper compartment;

d. a central roller extending between said end members;

e. a finite length of polymer member and closed-cell foam member wound about said central roller; and f. a compartment box affixed to said polymer member and said closed-cell foam member.

\* \* \* \* \*